(12) United States Patent
Göbbels

(10) Patent No.: US 12,722,553 B2
(45) Date of Patent: Sep. 1, 2026

(54) CONTAINER RECEIVING APPARATUS FOR A VEHICLE INTERIOR

(71) Applicant: BOS GmbH & Co. KG, Ostfildern (DE)

(72) Inventor: Andreas Göbbels, Kürten (DE)

(73) Assignee: BOS GmbH & Co. KG, Ostfildern (DE)

(*) Notice: Subject to any disclaimer, the term of this patent is extended or adjusted under 35 U.S.C. 154(b) by 310 days.

(21) Appl. No.: 18/473,516

(22) Filed: Sep. 25, 2023

(65) Prior Publication Data

US 2024/0101013 A1 Mar. 28, 2024

(30) Foreign Application Priority Data

Sep. 26, 2022 (DE) ......................... 102022210103.0

(51) Int. Cl.
*B60N 3/10* (2006.01)

(52) U.S. Cl.
CPC .................................... *B60N 3/106* (2013.01)

(58) Field of Classification Search
CPC .......... B60N 3/10; B60N 3/103; B60N 3/102; B60N 3/105; B64D 11/0627; B64D 11/0636
See application file for complete search history.

(56) References Cited

U.S. PATENT DOCUMENTS 7,757,888 B2 * 7/2010 Ogura .................... B60N 3/106 220/8
8,827,108 B2 * 9/2014 Tsunoda ................. B60N 3/102 220/737
9,333,891 B2 5/2016 Sitzler et al.
2004/0069792 A1 4/2004 Schaal
2009/0039095 A1 2/2009 Ogura
(Continued)

FOREIGN PATENT DOCUMENTS

CN 104972947 A 10/2015
CN 215513375 U 1/2022
(Continued)

OTHER PUBLICATIONS

German Office Action issued in corresponding German Application No. 10 2022 210 103.0, mailed Jul. 4, 2023 (5 pages).
(Continued)

*Primary Examiner* — Nicholas McFall
*Assistant Examiner* — Eric Acosta
(74) *Attorney, Agent, or Firm* — FLYNN THIEL, P.C.

(57) ABSTRACT

Container receiving apparatus for a vehicle interior having a carrier structure mounted so as to be secured to a vehicle, and a container receiving frame displaceable in height relative to the carrier structure and bordering at least one container receiving member and guided for linear displacement by a linear guiding device in a vertical direction. The apparatus also includes a cover supported on the carrier structure for pivoting movement between a closed position to cover the container receiving frame and an open position to release the container receiving frame for a linear displacement in a vertical direction. For linear displacement of the container receiving frame in a vertical direction between a rest position and a functional position, a rotationally effective, mechanical forced control apparatus is provided.

15 Claims, 4 Drawing Sheets

(56) References Cited

U.S. PATENT DOCUMENTS

| | | | | |
|---|---|---|---|---|
| 2012/0104011 | A1 | 5/2012 | Tsunoda | |
| 2016/0106246 | A1 * | 4/2016 | Sawada | B60N 3/106<br>220/737 |

FOREIGN PATENT DOCUMENTS

| | | | | | |
|---|---|---|---|---|---|
| DE | 10350118 | A1 | | 6/2005 | |
| DE | 102012208275 | A1 | | 11/2013 | |
| DE | 102012208278 | A1 | | 11/2013 | |
| GB | 2416749 | A | * | 2/2006 | B60N 3/107 |
| GB | 2612098 | A | | 4/2023 | |
| KR | 9621509 | U | | 7/1996 | |
| KR | 20060018118 | A | * | 2/2006 | B60N 3/10 |

OTHER PUBLICATIONS

Chinese Office Action issued in corresponding Chinese Application No. 202311245429.2 dated Apr. 29, 2026 (9 pages).

* cited by examiner

D
1
3
3
2
S
4
10
M
5
6
5
4

D
S
11
9
4
5
10a
10b
3
9
10c
B
7
7
6
M
M
2
9
11
4
3

CONTAINER RECEIVING APPARATUS FOR A VEHICLE INTERIOR

CROSS-REFERENCE TO RELATED APPLICATION

This claims priority from German Application No. 10 2022 210 103.0, filed Sep. 26, 2022, the disclosure of which is hereby incorporated by reference in its entirety.

TECHNICAL FIELD

The invention relates to a container receiving apparatus for a vehicle interior having a carrier structure which can be mounted so as to be secured to a vehicle and a container receiving frame which can be displaced in terms of height relative to the carrier structure and which borders at least one container receiving member and is guided so as to be able to be linearly displaced by means of a linear guiding device in a vertical direction, and having a cover which is supported so as to be pivotably movable between a closed position which covers the container receiving frame and an open position which releases the container receiving frame for a linear displacement in a vertical direction.

BACKGROUND AND SUMMARY

Such a container receiving apparatus is known from DE 10 2012 208 278 A1. The container receiving apparatus has a carrier structure which in the operationally completely mounted state is arranged so as to be secured to the vehicle in a vehicle interior. The container receiving apparatus additionally has a container receiving frame which is supported so as to be able to be moved in terms of lifting relative to the carrier structure in the vertical vehicle direction using linear guides. The container receiving frame is moved upward in a vertical direction by means of a lifting drive in the form of a lifting spring arrangement. The container receiving apparatus is additionally associated with a cover which is pivotably movably supported on the carrier structure and which is provided with control profiles which cooperate with complementary control profiles on the container receiving frame in order, when the cover is moved from an open position into the closed position thereof, to press the container receiving frame counter to the resilient force of the lifting drive downward in the direction of the rest position thereof.

An aspect of the invention is to provide a container receiving apparatus of the type mentioned in the introduction which is simple to operate and is configured in an operationally reliable manner.

This is achieved in that, for linear displacement of the container receiving frame in a vertical direction between a rest position and a functional position, a rotationally effective, mechanical forced control apparatus is provided. The forced control apparatus takes over a linear displacement of the container receiving frame both in a vertical direction upward and in a vertical direction downward so that a permanent coupling between the forced control apparatus and the container receiving frame is provided. A regulated control of the vertical displacement of the container receiving frame both upward in the vertical direction and downward in the vertical direction is thereby ensured. The rotationally effective forced control apparatus may be effective about a rotation axis which is orientated in a vertical direction or also about a rotation axis which can be rotated in a transverse or longitudinal direction of a vehicle coordinate system. The forced control apparatus is thereby defined in that at least one control member of the forced control apparatus can be rotationally moved in order to linearly displace the container receiving frame in a vertical direction.

In one embodiment, the forced control apparatus has a threaded guide which is coaxial relative to a vertical center axis of the container receiving member and a circumferential tooth arrangement which is coaxial relative to the vertical center axis and which meshes with a complementary tooth arrangement of an actuation member which can be moved tangentially with respect to the circumferential tooth arrangement. In this instance, the actuation member may itself be configured to be rotationally movable or linearly movable. Via the actuation member, a rotational movement is applied to the circumferential tooth arrangement which in turn causes the threaded guide to carry out a rotational movement, whereby an upward screwing or a downward screwing of the container receiving frame is produced. The container receiving frame itself is supported so as to be able to be linearly moved exclusively in a vertical direction relative to the carrier structure. The container receiving frame is, however, forcibly coupled to the actuation member via the threaded guide and the circumferential tooth arrangement. A rotation of the circumferential tooth arrangement and the threaded guide which is rotationally secure with the circumferential tooth arrangement coaxially with respect to the vertical center axis of the container receiving member leads to an introduction of a lifting movement in the container receiving frame. In the case of two or more container receiving members, the tooth arrangement of the actuation member may also cooperate with an actuation tooth arrangement, which is functionally separated from the circumferential tooth arrangement, of the threaded guide.

In another embodiment, the container receiving frame has a cylindrical wall which surrounds the container receiving member and the forced control apparatus has a cylindrical sleeve which coaxially surrounds the wall and on which the threaded guide and the circumferential tooth arrangement are provided, and the cylindrical sleeve is rotatably supported on the carrier structure about the vertical center axis. As a result, corresponding control members of the forced control apparatus are arranged in a space-saving manner around the container receiving member.

In another embodiment, the threaded guide has a slotted helical member which is provided on the cylindrical sleeve and a crank pin which protrudes radially from the container receiving frame and which engages in the slotted helical member. The at least one slotted helical member and the at least one crank pin form the threaded guide in the context of the invention. The slotted helical member forms a slotted member path which extends in a circumferential direction and which additionally rises or falls in the vertical direction. The slotted helical member may have a consistent inclination or a changing inclination. The crank pin is guided in a linearly movable manner in the slotted helical member. Since the slotted helical member rotates coaxially relative to the vertical center axis of the container receiving member, a rotation of the slotted helical member necessarily brings about a vertical displacement of the crank pin so that the container receiving frame is moved upward or downward in a vertical direction. The threaded guide may have a plurality of slotted helical members which are arranged in a state distributed over the circumference of the cylindrical sleeve, and a corresponding number of crank pins.

In another embodiment, the cover is mechanically coupled to the actuation member in such a manner that, in the event of a pivot movement of the cover into the open position, the container receiving frame is displaced upward in a vertical direction into the functional position and, in the event of a pivot movement of the cover into the closed position, it is displaced downward in a vertical direction into the rest position. As a result, the cover and the actuation member are additionally permanently coupled to each other. Therefore, if an operator carries out a pivot movement of the cover—depending on the position of the cover—into the closed position or the open position, there is necessarily produced a complementary lifting movement of the container receiving frame in an upward or downward direction. A manual gripping of the cover leads to a corresponding introduction of a pivot movement of the cover. The cover is preferably supported so as to be able to be pivotably moved on the carrier structure. Additional lifting drives, such as in particular a lifting spring arrangement, as known from the prior art, are not required with the container receiving apparatus according to the invention.

In another embodiment, the container receiving frame has two container receiving members which are arranged beside each other and which are each surrounded by a cylindrical wall of the container receiving frame, and for each container receiving member a cylindrical sleeve with a threaded guide and a circumferential tooth arrangement is provided. The two cylindrical sleeves surround the respective cylindrical wall of the respective container receiving member in a circumferential direction and are arranged so as to be able to be rotated coaxially with respect to the respective vertical center axis of the respective container receiving member. The two cylindrical walls of the two container receiving members are arranged in a manner fixed with respect to remaining portions of the container receiving frame.

In another embodiment, the threaded guides of the two cylindrical sleeves are configured in opposite directions to each other, and the circumferential tooth arrangements of both cylindrical sleeves mesh with each other or with the tooth arrangement of the actuation member. The threaded guides have identical pitch values with respect to the respective slotted helical member.

In another embodiment, the actuation member engages tangentially on at least one of the two cylindrical sleeves and meshes in particular with an actuation tooth arrangement of a cylindrical sleeve. The individual actuation member in the form of an in particular integral component consequently brings about during a linear displacement necessarily opposing rotations of the circumferential tooth arrangements of the two cylindrical sleeves, whereby the desired lifting movement is applied to the container receiving members of the container receiving frame.

In another embodiment, the actuator member is supported in a linearly movable manner on the carrier structure and is connected to the cover by means of a mechanical coupling member, in particular a slotted guiding member. The permanent connection between the cover and the actuation member via the mechanical coupling member enables with a pivot movement of the cover a corresponding linear movability of the actuation member.

In another embodiment, the slotted helical member has a helically rising inclination portion and two end portions which adjoin the inclination portion at the top and at the bottom and which are orientated so as to be inclination-free in a circumferential direction. For the two end positions of the container receiving frame via the threaded guide, a locking is thereby achieved since the corresponding crank pin can be positioned orthogonally with respect to the lifting movability of the container receiving frame in the end portions which extend exclusively in the circumferential direction. In these end portions, there is consequently no vertical displacement of the container receiving frame.

Other advantages and features will be appreciated from the claims and from the following description of a preferred exemplary embodiment of the invention which is illustrated with reference to the drawings.

DETAILED DESCRIPTION

Figure 1:
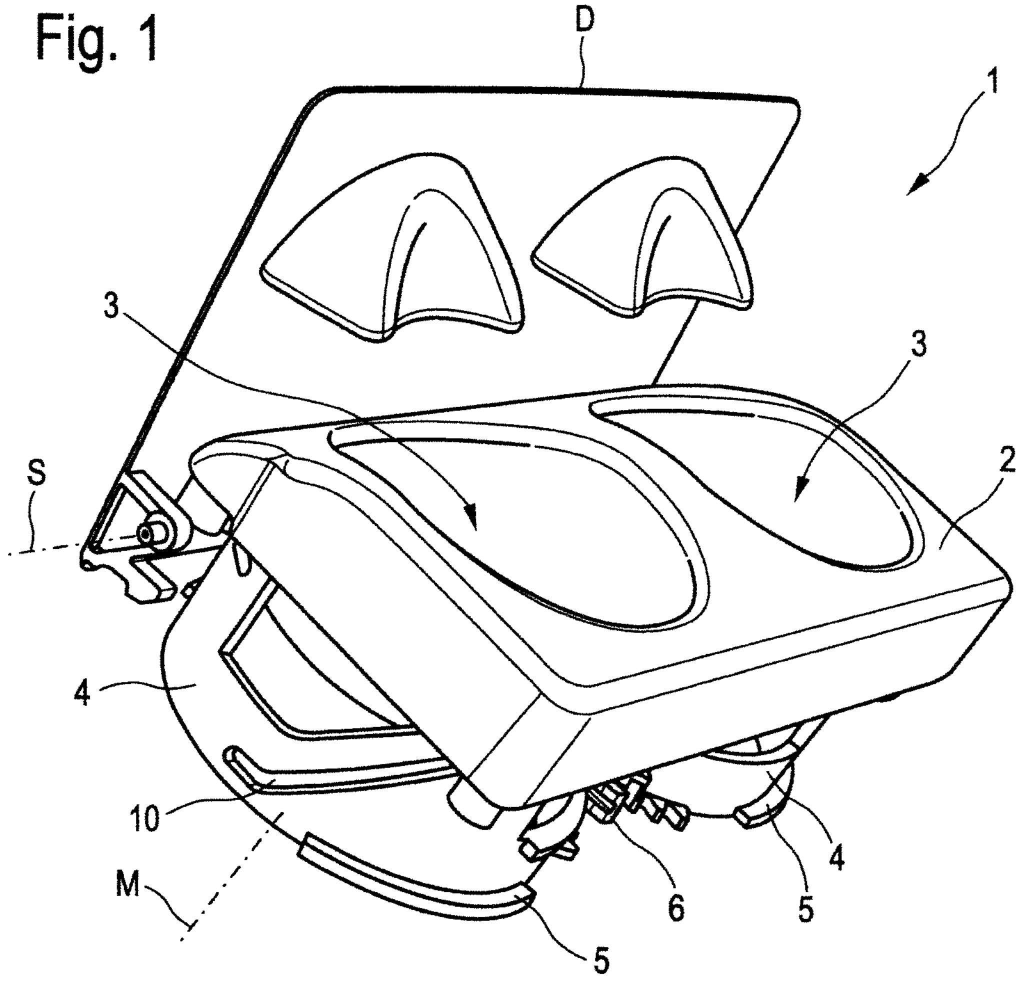
FIG. 1 shows a perspective illustration of an embodiment of a container receiving apparatus according to the invention with a carrier structure being omitted.

A container receiving apparatus 1 according to FIGS. 1 to 4 has in a manner which is not illustrated in greater detail a carrier structure which is arranged in a state mounted so as to be secured to the vehicle in a vehicle interior of a motor vehicle, in particular a passenger vehicle. The carrier structure has a base which is provided with a rectangular base face. At the four corner regions of the rectangular base face of the base of the carrier structure, there are provided four guiding profiles which protrude upward in a vertical direction and on which an integral container receiving frame 2 which is produced from plastics material is placed so as to be able to be linearly moved in a vertical direction. To this end, the container receiving frame 2 which also has a rectangular base face has at the corner regions thereof four guiding sleeves 9 which are inserted so as to be able to be moved in a sliding manner on the guiding profiles of the carrier structure which are not illustrated. The guiding profiles of the carrier structure and the complementary guiding sleeves 9 of the container receiving frame 2 form a linear guiding device in the context of the invention.

The container receiving frame 2 forms two cylindrical container receiving members 3 which are arranged beside each other in the container receiving frame 2. Each container receiving member 3 is bordered by a cylindrical wall which is in each case an integral component of the container receiving frame 2. The two cylindrical walls of the two container receiving members 3 define in each case a vertical center axis M which are orientated parallel with each other in a vertical vehicle direction. The terms “vertical direction” and “vertical vehicle direction” are intended to be understood to be equivalent and refer to an installed state of the container receiving apparatus 1 in the vehicle interior.

Figure 2:
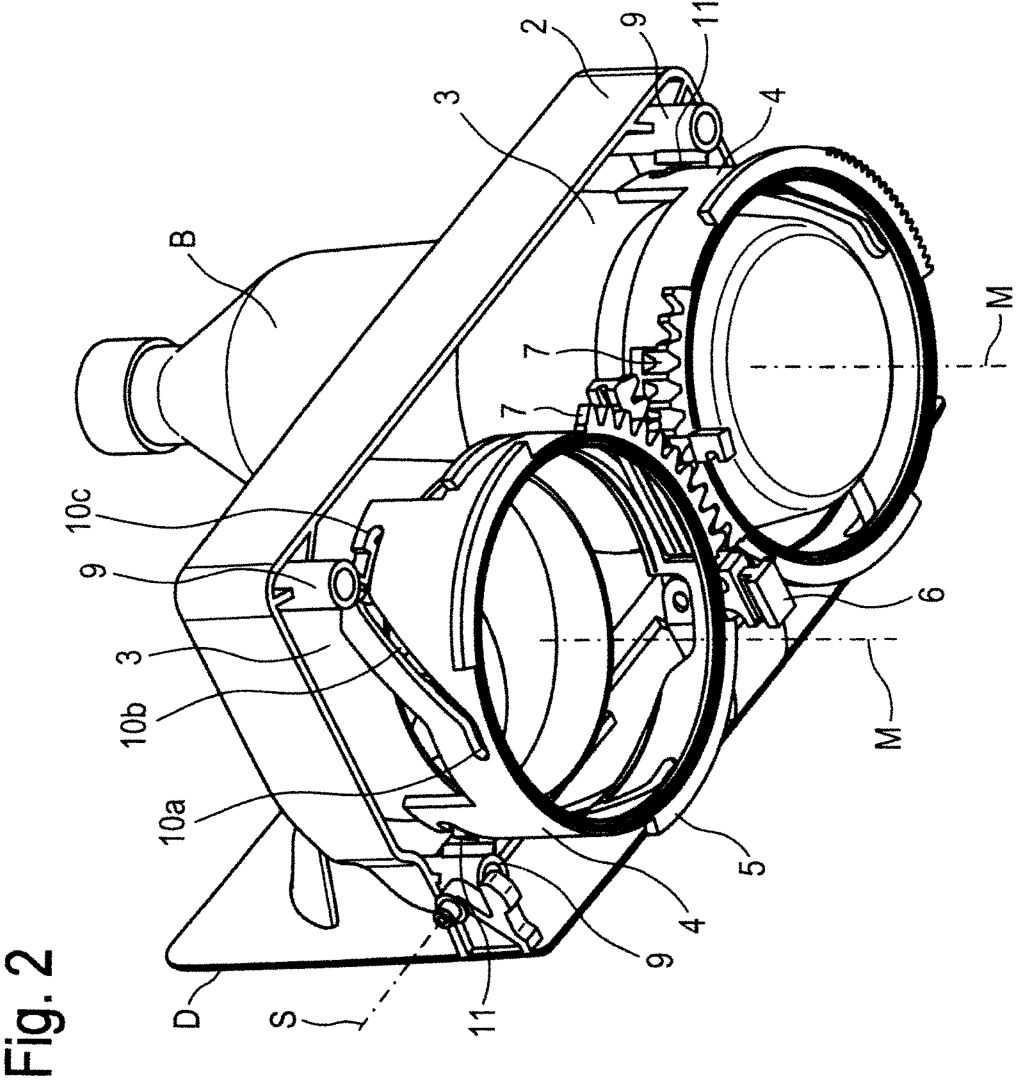
FIG. 2 shows the container receiving apparatus according to FIG. 1 from a perspective obliquely from below.
Figure 3:
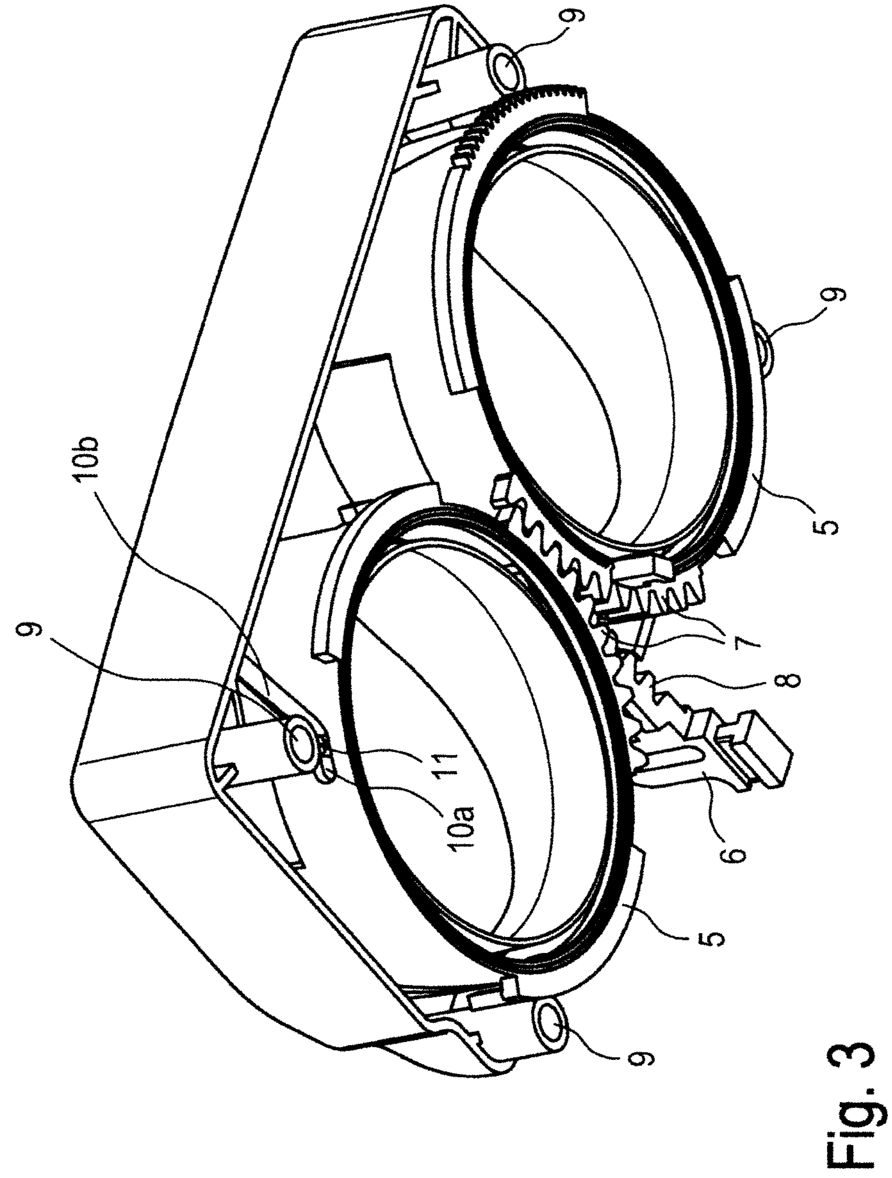
FIG. 3 shows the container receiving apparatus according to FIG. 2 in a rest position with the cover being omitted.

With reference to FIG. 2, it can be seen that in each container receiving member 3 a drinks container B, which in the inserted state is supported at the bottom on the base face of the carrier structure, can be inserted.

Figure 4:
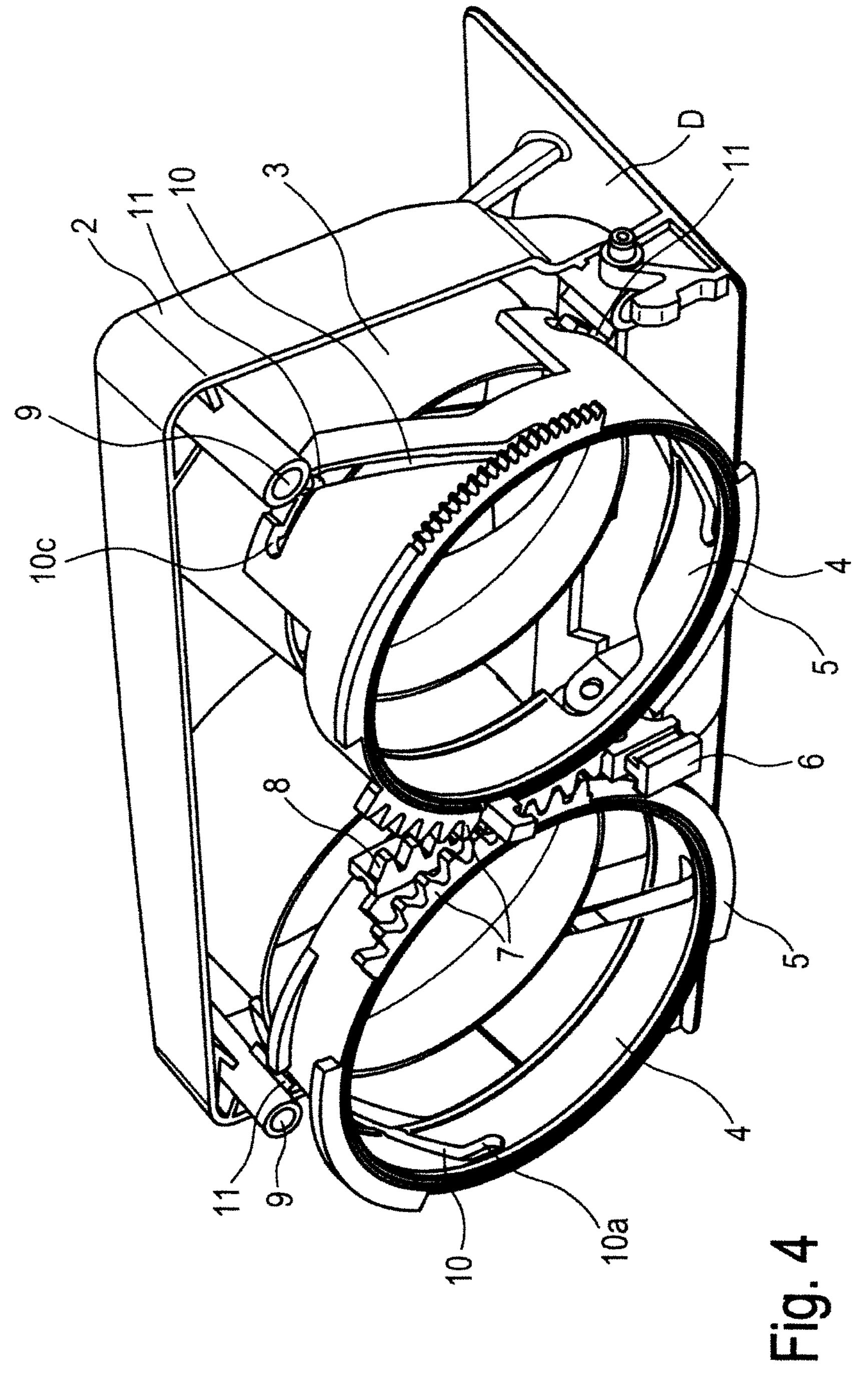
FIG. 4 shows the container receiving apparatus according to FIG. 2 from another perspective.

On a rear longitudinal side of the container receiving frame 2, there is articulated a cover D which is supported on the container receiving frame 2 so as to be able to be pivotably moved about a pivot axis S which extends in a transverse vehicle direction or vehicle longitudinal direction—depending on the orientation of the container receiving apparatus 1 in the vehicle interior. With reference to FIGS. 1, 2 and 4, an open position of the cover D in which the cover 2 is orientated in a vertical vehicle direction is illustrated. In a closed position, the cover D covers the two container receiving members 3 of the container receiving frame 2. In the closed position, the cover D is orientated in a horizontal plane so that the cover D carries out between the closed position and the open position a pivot path of at least substantially 90°.

In order to displace the container receiving frame 2 in a linearly movable manner in the vertical vehicle direction, a forced control apparatus which will be described in greater detail below is provided. The forced control apparatus is rotationally effective and has for each container receiving member 3 a respective threaded guide, wherein the two threaded guides can be moved synchronously with respect to each other. Each threaded guide has a cylindrical sleeve 4 which surrounds the cylindrical wall of the respective container receiving member 3 at the outer side coaxially with respect to the vertical center axis M. An inner diameter of the cylindrical sleeve 4 is slightly larger than an outer diameter of the cylindrical wall of the associated container receiving member 3 so that the respective cylindrical sleeve 4 surrounds the container receiving member 3 at the outer side with a small radial play. Each of the two cylindrical sleeves is provided with two slotted helical members 10 which are arranged in a state distributed over the circumference of the cylindrical sleeve 4 and in which a crank pin 11 which is secured to the container receiving frame 2 protrudes in each case. The respective crank pin 11 protrudes from the respective guiding sleeve 9 of a corner region of the container receiving frame 2 internally in a radially inward direction with respect to the vertical center axis M so that in each case two crank pins 11 engage from two corner regions of the container receiving frame 2 in the two slotted helical members 10 of a cylindrical sleeve 4 in each case. Each slotted helical member 10 is in the form of a slot in the respective cylindrical sleeve 4, wherein each slotted helical member has an inclination portion 10*b* which extends in a circumferential direction and which rises or falls in a vertical direction and two end portions 10*a* and 10*c* which adjoin the respective inclination portion 10*b* at the top and at the bottom. The two end portions 10*a* and 10*c* extend exclusively in a circumferential direction of the respective cylindrical sleeve 4 and consequently horizontally.

Both cylindrical sleeves 4 are additionally provided over a part-region of the circumference thereof in a lower radially outwardly directed edge region with a circumferential tooth arrangement 7 in each case. The two circumferential tooth arrangements 7 of the two adjacent cylindrical sleeves 4 mesh with each other, as can be clearly seen in FIGS. 2 to 4. A rotation of one cylindrical sleeve 4 about the vertical center axis M consequently necessarily leads to an opposing rotational movement of the adjacent cylindrical sleeve 4. The slotted helical members 10 of the adjacent cylindrical sleeves 4 are accordingly provided so as to complement the opposing synchronization of the cylindrical sleeves 4 in an opposing direction with inclination and end portions so that, with a synchronous, opposite rotational movement of both cylindrical sleeves 4, a parallel displacement of the container receiving frame 2 in a vertical direction upward or downward is carried out—depending on the rotation direction of the cylindrical sleeves 4. The upper and lower horizontal end portions 10*a*, 10*c* of both cylindrical sleeves 4 serve to lock the container receiving frame 3 in the lower rest position thereof or the upper functional position thereof, wherein the lower end portions 10*a* define the lower rest position and the upper end portions 10*c* define the upper functional position.

The two cylindrical sleeves 4 are supported so as to be able to be rotationally moved in the region of the base of the carrier structure about the respective vertical center axis M. To this end, on a lower external edge region of the respective cylindrical sleeve 4 in a circumferential direction in a manner offset with respect to the respective circumferential tooth arrangement 7 there are provided guiding webs 5 which protrude integrally from the respective cylindrical sleeve 4 in a radially outward direction. In the base region of the carrier structure, there are provided complementary guiding profiles which engage over the guiding webs 5 in such a manner that the respective cylindrical sleeve 4 is supported in a rotationally movable manner on the carrier structure and is retained in a state secured in the vertical direction in a positive-locking manner on the base of the carrier structure.

In order to introduce a rotational movement into the mutually meshing cylindrical sleeves 4, there is supported in a linearly movable manner in the region of the base of the carrier structure an actuation member 6 which has a toothed rod portion which can be linearly moved in a tangential manner between the two cylindrical sleeves 4. The toothed rod portion has a tooth arrangement which faces one of the two cylindrical sleeves 4. The corresponding cylindrical sleeve 4 has an additional actuation tooth arrangement which complements the tooth arrangement of the toothed rod portion and which forms according to the illustration according to FIGS. 2 and 3 in the region of the engagement of the toothed rod portion of the actuation member 6 a tooth arrangement, which is extended in a vertical direction and which also extends in a circumferential direction, of the circumferential tooth arrangement 7. The portion of the circumferential tooth arrangement 7 which is extended in an upward vertical direction forms an actuation tooth arrangement of the cylindrical sleeve 4 with which the toothed rod portion of the actuation member 6 meshes.

The extension of individual teeth of the circumferential tooth arrangement 7 of one cylindrical sleeve 4 in the vertical direction at the outer side on the cylindrical sleeve 4 avoids the formation of a completely independent actuation tooth arrangement with which the toothed rod portion of the actuation member 6 meshes.

The actuation member 6 is in the region of the rear side thereof remote from the toothed rod portion additionally permanently connected by means of a mechanical coupling member, in this instance in the form of a slotted guiding member which is not illustrated, to the cover D so that a pivot movement of the cover D necessarily also leads to a linear displacement movement of the actuation member 6. In this instance, the coupling between the cover D and the actuation member 6 is configured in such a manner that, in the event of a pivot movement of the cover D from the closed position in the direction of the open position, the container receiving frame 2 is displaced upward in a parallel force-controlled manner and, when the cover D is moved from the open position back into the closed position, the container receiving frame 2 is necessarily displaced in a parallel manner in a downward direction back into the rest position thereof.

The invention claimed is:

1. A container receiving apparatus for a vehicle interior, the container receiving apparatus comprising:

a carrier structure configured for mounting in a vehicle interior;

at least one container receiving member having a container receiving recess defining a vertical central axis;

a linear guiding device;

a container receiving frame, the container receiving frame being displaceable in terms of height relative to the carrier structure and bordering the at least one container receiving member, the at least one container receiving member being displaceable along with the container receiving frame, the container receiving frame being guided for linear displacement by the linear guiding device in a vertical direction;

a mechanical control apparatus for linearly displacing the container receiving frame relative to the carrier structure in the vertical direction between a rest position and a functional position, the control apparatus including at least one control member supported for rotation on the carrier structure coaxially relative to the vertical central axis; and a cover supported so as to be pivotably movable between a closed position in which the cover covers the container receiving frame and an open position, the cover in the open position permitting linear displacement of the container receiving frame in the vertical direction.

2. The container receiving apparatus according to claim 1, wherein the control apparatus has an actuation member and a guide arrangement, the at least one control member comprising a circumferential tooth arrangement oriented coaxially relative to the vertical central axis, the actuation member having a tooth arrangement complementary to the circumferential tooth arrangement of the at least one control member, the circumferential tooth arrangement meshing with the tooth arrangement of the actuation member, and the actuation member being movable tangentially with respect to the circumferential tooth arrangement.

3. The container receiving apparatus according to claim 2, wherein the at least one container receiving member has a cylindrical wall defining the container receiving recess and the at least one control member of the control apparatus comprises a cylindrical sleeve coaxially surrounding the cylindrical wall, a component of the guide arrangement and the circumferential tooth arrangement being provided on the cylindrical sleeve, the cylindrical sleeve being rotatably supported on the carrier structure about the vertical central axis.

4. The container receiving apparatus according to claim 3, wherein the component of the guide arrangement comprises a slotted helical member disposed on the cylindrical sleeve and the guide arrangement further includes a crank pin protruding radially from the container receiving frame and engaging in the slotted helical member.

5. The container receiving apparatus according to claim 2, wherein the cover is mechanically coupled to the actuation member such that, in the event of a pivoting movement of the cover into the open position, the container receiving frame is displaced upward in the vertical direction into the functional position and, in the event of a pivoting movement of the cover into the closed position, the container receiving frame and the at least one container receiving member are displaced downward in the vertical direction into the rest position.

6. The container receiving apparatus according to claim 2, wherein the at least one container receiving member forms part of the container receiving frame, and the at least one container receiving member comprises two container receiving members arranged beside each other within the container receiving frame and each has a cylindrical wall defining the respective container receiving recess, and the at least one control member comprises at least two control members, each of the control members comprising a cylindrical sleeve, each cylindrical sleeve being disposed in surrounding relation with one of the container receiving members, each of the cylindrical sleeves including a guide slot and a circumferential tooth arrangement.

7. The container receiving apparatus according to claim 6, wherein the guide slots are oriented in opposite directions to each other, and the circumferential tooth arrangements of both of the cylindrical sleeves mesh with each other, and at least one of the circumferential tooth arrangements meshes with the tooth arrangement of the actuation member.

8. The container receiving apparatus according to claim 7, wherein the tooth arrangement of the actuation member engages tangentially with the at least one circumferential tooth arrangement.

9. The container receiving apparatus according to claim 2, further comprising a mechanical coupling member, and the actuation member is supported in a linearly movable manner on the carrier structure and is connected to the cover by the mechanical coupling member.

10. The container receiving apparatus according to claim 4, wherein the slotted helical member has a helically rising inclination portion and two end portions adjoining the inclination portion at a top and at a bottom, the two end portions being orientated so as to be inclination-free in a circumferential direction.

11. The container receiving apparatus according to claim 1, wherein the cover is operatively connected to the at least one control member such that movement of the cover to the open position causes linear displacement of the container receiving frame in the vertical direction.

12. The container receiving apparatus according to claim 8, wherein the at least one circumferential tooth arrangement comprises an actuation tooth arrangement engaged with the tooth arrangement of the actuation member.

13. A container receiving apparatus for a vehicle interior having a carrier structure fixed to the vehicle, the container receiving apparatus comprising:

a container receiving frame including at least one container receiving member defining a substantially cylindrical and upwardly opening container receiving recess therein defining a vertically-oriented central axis;

a linear guiding device cooperating between the container receiving frame and the carrier structure of the vehicle for guiding vertical displacement of the container receiving frame relative to the carrier structure;

a control mechanism for linearly displacing the container receiving frame relative to the carrier structure in a vertical direction between a rest position and a functional position, the control mechanism including at least one control member supported for rotation on the carrier structure coaxially relative to the central axis; and a cover mounted on the container receiving frame for pivoting movement between a closed position and an open position, the cover in the closed position covering the container receiving frame and the recess therein and in the open position uncovering the container receiving frame and the recess, wherein movement of the cover member into the open position permits linear vertical displacement of the container receiving frame.

14. The container receiving apparatus according to claim 13, wherein the cover is operatively connected to the at least one control member of the control mechanism such that movement of the cover member into the open position causes linear vertical displacement of the cover receiving frame.

15. A container receiving apparatus for a vehicle interior comprising a carrier structure securely mounted to a vehicle and a container receiving frame displaceable in height relative to the carrier structure and having a cylindrical wall surrounding at least one container receiving member, the container receiving frame being guided for linear displacement by a linear guiding device in a vertical direction, the container receiving apparatus further including a cover supported so as to be pivotably movable between a closed position covering the container receiving frame and an open position releasing the container receiving frame for a linear displacement in the vertical direction, the container receiving apparatus, for linear displacement of the container receiving frame in the vertical direction between a rest position and a functional position, further including a rotationally effective, mechanical forced control apparatus, the forced control apparatus having a threaded guide coaxial relative to a vertical center axis of the container receiving member and a circumferential tooth arrangement coaxial relative to the vertical center axis and meshing with a complementary tooth arrangement of an actuation member movable tangentially with respect to the circumferential tooth arrangement, the forced control apparatus further including a cylindrical sleeve coaxially surrounding the wall of the container receiving frame, the threaded guide and the circumferential tooth arrangement being provided on the cylindrical sleeve, the cylindrical sleeve being rotatably supported on the carrier structure about the vertical center axis, and the threaded guide having a slotted helical member on the cylindrical sleeve and a crank pin protruding radially from the container receiving frame and engaging in the slotted helical member.

* * * * *